(12) United States Patent
Feng et al.

(10) Patent No.: US 9,954,429 B2
(45) Date of Patent: Apr. 24, 2018

(54) CONVERTER AND VOLTAGE CLAMP CIRCUIT THEREIN

(71) Applicant: Delta Electronics (Shanghai) Co., Ltd., Shanghai (CN)

(72) Inventors: Wei-Yi Feng, Shanghai (CN); Wei-Qiang Zhang, Shanghai (CN); Hong-Yang Wu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 328 days.

(21) Appl. No.: 14/637,371

(22) Filed: Mar. 3, 2015

(65) Prior Publication Data

US 2015/0303789 A1    Oct. 22, 2015

(30) Foreign Application Priority Data

Apr. 18, 2014 (CN) .......................... 2014 1 0157439

(51) Int. Cl.
*H02M 1/34* (2007.01)
*H02M 7/217* (2006.01)
(Continued)

(52) U.S. Cl.
CPC .............. *H02M 1/32* (2013.01); *H02M 1/34* (2013.01); *H02M 3/04* (2013.01); *H02M 7/487* (2013.01);
(Continued)

(58) Field of Classification Search
CPC .......... H02M 7/04; H02M 7/12; H02M 7/125; H02M 7/217; H02M 7/219; H02M 7/42;
(Continued)

(56) References Cited

U.S. PATENT DOCUMENTS

| 6,295,213 B1 * | 9/2001 | Smith | ............... H02M 3/33569 |
| | | | 363/21.01 |
| 7,342,811 B2 * | 3/2008 | Domb | ..................... H02M 1/34 |
| | | | 363/21.06 |

(Continued)

FOREIGN PATENT DOCUMENTS

| CN | 1645732 A | 7/2005 |
| CN | 102255538 A | 11/2011 |

(Continued)

*Primary Examiner* — Timothy J Dole
*Assistant Examiner* — Ivan Laboy Andino
(74) *Attorney, Agent, or Firm* — CKC & PARTNERS CO., LTD.

(57) ABSTRACT

A converter includes a first bridge arm, a second bridge arm, two switch units and a voltage clamp circuit. The first bridge arm includes a first switch unit and a second switch unit that are electrically coupled in series at an output terminal. The second bridge arm includes two voltage sources that are electrically coupled in series at a neutral point terminal. The two switch units are electrically coupled in series at a common connection terminal, and are arranged between the neutral point terminal and the output terminal. The voltage clamp circuit is electrically coupled to the output terminal, the common connection terminal, the neutral point terminal, and one of a positive input terminal or a negative input terminal, and the circuit is shared by the two switch units to clamp voltages across the two switch units.

2 Claims, 14 Drawing Sheets

(51) Int. Cl.
*H02M 7/219* (2006.01)
*H02M 7/487* (2007.01)
*H02M 7/5387* (2007.01)
*H02M 1/32* (2007.01)
*H02M 3/04* (2006.01)

(52) U.S. Cl.
CPC ............ *H02M 7/217* (2013.01); *H02M 7/219* (2013.01); *H02M 7/5387* (2013.01); *H02M 2001/342* (2013.01); *H02M 2001/344* (2013.01); *H02M 2001/346* (2013.01); *H02M 2001/348* (2013.01); *Y02B 70/1491* (2013.01)

(58) Field of Classification Search
CPC .......... H02M 7/44; H02M 7/48; H02M 7/487; H02M 7/537; H02M 7/5387; H02M 7/797; H02M 1/32; H02M 1/34; H02M 2001/322; H02M 2001/325; H02M 2001/342; H02M 2001/344; H02M 2001/346; H02M 2001/348
See application file for complete search history.

(56) References Cited

U.S. PATENT DOCUMENTS

| | | |
|---|---|---|
| 2005/0063124 A1 | 3/2005 | Lundberg et al. |
| 2005/0180179 A1 | 8/2005 | Hirst et al. |
| 2011/0286252 A1 | 11/2011 | Cui et al. |
| 2012/0307533 A1* | 12/2012 | Gekeler ................ H02M 7/487 |
| | | 363/41 |

FOREIGN PATENT DOCUMENTS

| | | |
|---|---|---|
| CN | 102957332 A | 3/2013 |
| EP | 2717454 A1 | 4/2014 |
| JP | H07-031158 | 1/1995 |
| JP | H10-201247 A | 7/1998 |
| JP | 2004-538746 A | 12/2004 |
| JP | 3647178 B2 | 5/2005 |
| JP | 2010-57239 A | 3/2010 |
| JP | 2014-165964 A | 9/2014 |
| WO | 2003/015233 A1 | 2/2003 |

* cited by examiner

CONVERTER AND VOLTAGE CLAMP CIRCUIT THEREIN

RELATED APPLICATIONS

This application claims priority to China Patent Application Serial Number 201410157439.5, filed Apr. 18, 2014, which is herein incorporated by reference.

BACKGROUND

Technical Field

The present disclosure relates to a converter. More particularly, the present disclosure relates to a voltage clamp circuit in a converter.

Description of Related Art

Conventionally, a converter having multi-level output is widely applied in related fields such as solar inverter, uninterruptible power supply (UPS), power conditioning system (PCS), etc.

The converter usually includes devices such as switches, in which the switch on a current commutation path is switched on and off alternately to perform a current commutation operation.

However, parasitic inductance usually exists in the current path, and thus, in a transient period of the aforementioned switch being switched on and off alternately, the existence of the parasitic inductance results in that the aforementioned switch sustains a higher voltage, and even when the aforementioned switch is switched off, voltage spikes are generated to affect the aforementioned switch. For example, when an input voltage of the converter is 380 Volts, the voltage spikes may reach up to 600 Volts and is much higher than a rated voltage sustainable for the switch, in the transient period of the aforementioned switch being switched off. As a result, damages to the switch are caused such that the converter cannot operate normally.

SUMMARY

An aspect of the present disclosure is related to a converter. The converter includes a first bridge arm, a second bridge arm, a third switch unit, a fourth switch unit, and a voltage clamp circuit. The first bridge arm includes a first switch unit and a second switch unit, and the first switch unit and the second switch unit are electrically coupled in series at an output terminal. The second bridge arm includes a first voltage source and a second voltage source, and the first voltage source and the second voltage source are electrically coupled in series at a neutral point terminal, and the first voltage source and the second voltage source are arranged between a positive input terminal and a negative input terminal. The third switch unit and the fourth switch unit are electrically coupled in series at a common connection terminal and are arranged between the neutral point terminal and the output terminal. The voltage clamp circuit is electrically coupled to the output terminal, the common connection terminal, the neutral point terminal, and one of the positive input terminal and negative input terminal, in which the voltage clamp circuit is shared by the third switch unit and the fourth switch unit to clamp voltages across the third switch unit and the fourth switch unit.

Another aspect of the present disclosure is related to a converter. The converter includes a first bridge arm, a second bridge arm, a third switch unit, a fourth switch unit, a voltage clamp circuit, and an active circuit. The first bridge arm includes a first switch unit and a second switch unit, and the first switch unit and the second switch unit are electrically coupled in series at an output terminal. The second bridge arm includes a first voltage source and a second voltage source, and the first voltage source and the second voltage source are electrically coupled in series at a neutral point terminal, and the first voltage source and the second voltage source are arranged between a positive input terminal and a negative input terminal. The third switch unit and a fourth switch unit are electrically coupled in series at a common connection terminal and are arranged between the neutral point terminal and the output terminal. The voltage clamp circuit includes a sharing circuit and an active circuit. The sharing circuit is electrically coupled to the output terminal, the common connection terminal and the neutral point terminal, and the sharing circuit is configured to clamp voltages across the third switch unit and the fourth switch unit and store a clamping voltage. The active circuit is electrically coupled to the sharing circuit and configured to output an operation voltage to one of the positive input terminal, negative input terminal, the output terminal, and a driving circuit according to the clamping voltage, in which the driving circuit is configured to drive the third switch unit or the fourth switch unit.

Still another aspect of the present disclosure is related to a voltage clamp circuit configured in a converter. The converter includes a first switch unit, a second switch unit, a third switch unit, a fourth switch unit, a first voltage source, and a second voltage source. The first voltage source and the second voltage source are electrically coupled in series between a positive input terminal and a negative input terminal and connected at a neutral point terminal. The first switch unit and the second switch unit are electrically coupled in series between the positive input terminal and the negative input terminal and connected at an output terminal. The third switch unit and the fourth switch unit are electrically coupled in series between the neutral point terminal and the output terminal and connected at a common connection terminal. The voltage clamp circuit includes a first terminal, a second terminal, a third terminal, and a fourth terminal. The first terminal is electrically coupled to the neutral point terminal of the converter. The second terminal is electrically coupled to the output terminal of the converter. The third terminal is electrically coupled to the common connection terminal of the converter. The fourth terminal is electrically coupled to the positive input terminal or the negative input terminal of the converter. The voltage clamp circuit is shared by the third switch unit and the fourth switch unit to clamp voltages across the third switch unit and the fourth switch unit.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of various embodiments, with reference to the accompanying drawings as follows.

DETAILED DESCRIPTION

Figure 1A:
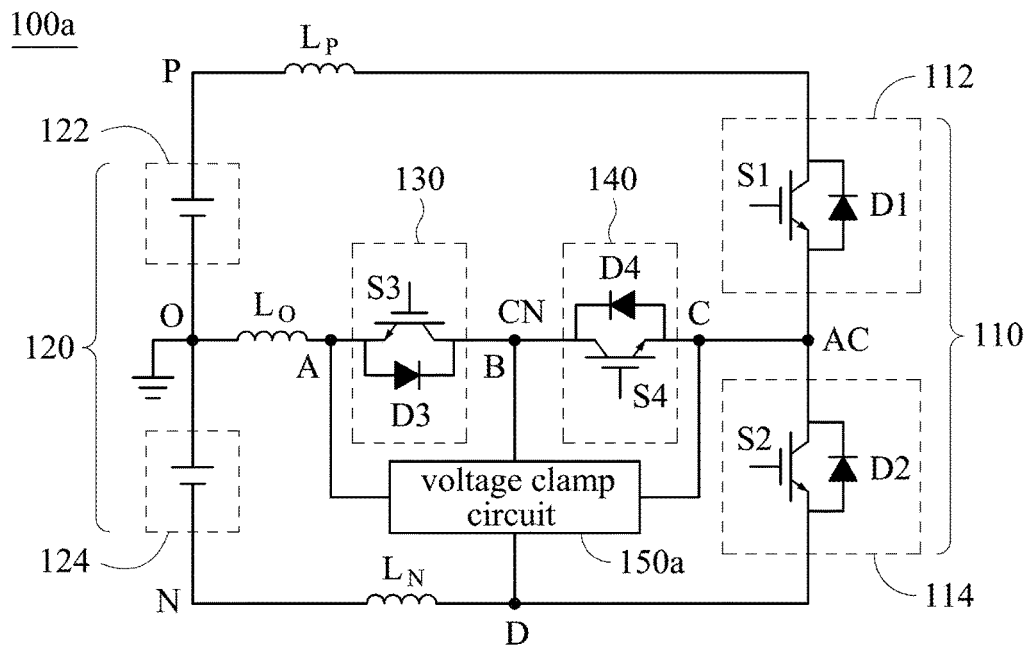
FIG. 1A is a schematic diagram of a converter according to a first embodiment of the present disclosure.

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

As used herein, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

It will be understood that in the present disclosure, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

FIG. 1A is a schematic diagram of a converter according to a first embodiment of the present disclosure. As illustrated in FIG. 1A, the converter 100a includes a first bridge arm 110, a second bridge arm 120, switch units 130 and 140, and a voltage clamp circuit 150a.

The first bridge arm 110 includes switch units 112 and 114. The switch units 112 and 114 are electrically coupled in series at an output terminal AC and arranged between a positive input terminal P and a negative input terminal N. The second bridge arm 120 includes voltage sources 122 and 124. The voltage sources 122 and 124 are electrically coupled in series at a neutral point terminal O, and arranged between the positive input terminal P and the negative input terminal N. In one embodiment, the neutral point terminal O is electrically coupled to a ground terminal. Moreover, the switch units 130 and 140 are electrically coupled in series at a common connection terminal CN and arranged between the neutral point terminal O and the output terminal AC. In addition, the voltage clamp circuit 150a is electrically coupled to the output terminal AC, the common connection terminal CN, the neutral point terminal O, and the negative input terminal N. The voltage clamp circuit 150a is shared by the switch units 130 and 140 to clamp voltages across the switch units 130 and 140.

As shown in FIG. 1A, parasitic inductances LP, LN and LO exist in paths on which currents flow through the positive input terminal P, the negative input terminal N and the neutral point terminal O, respectively.

In one embodiment, the voltage clamp circuit 150a may include terminals A, B, C, and D, in which the terminal A is electrically coupled to the neutral point terminal O, the terminal B is electrically coupled to the common connection terminal CN where the switch units 130 and 140 are coupled in series, the terminal C is electrically coupled to the output terminal AC, and the terminal D is electrically coupled to the negative input terminal N.

In addition, in some embodiments, the phrase "voltage clamp circuit" in the present disclosure may be independently configured as a sharing circuit and shared by the switch units 130 and 140; in other embodiments, a sharing circuit is configured inside the voltage clamp circuit in the present disclosure, and the sharing circuit is electrically coupled to the terminals A, B, C, and D and is shared by the switch units 130 and 140, and the sharing circuit is configured to clamp voltages across the switch units 130 and 140, respectively, under the condition of the switch units 130 and 140 being separately switched off. In other words, descriptions related to the voltage clamp circuit in the following embodiments can be referred to as the aforementioned sharing circuit.

Figure 1B:
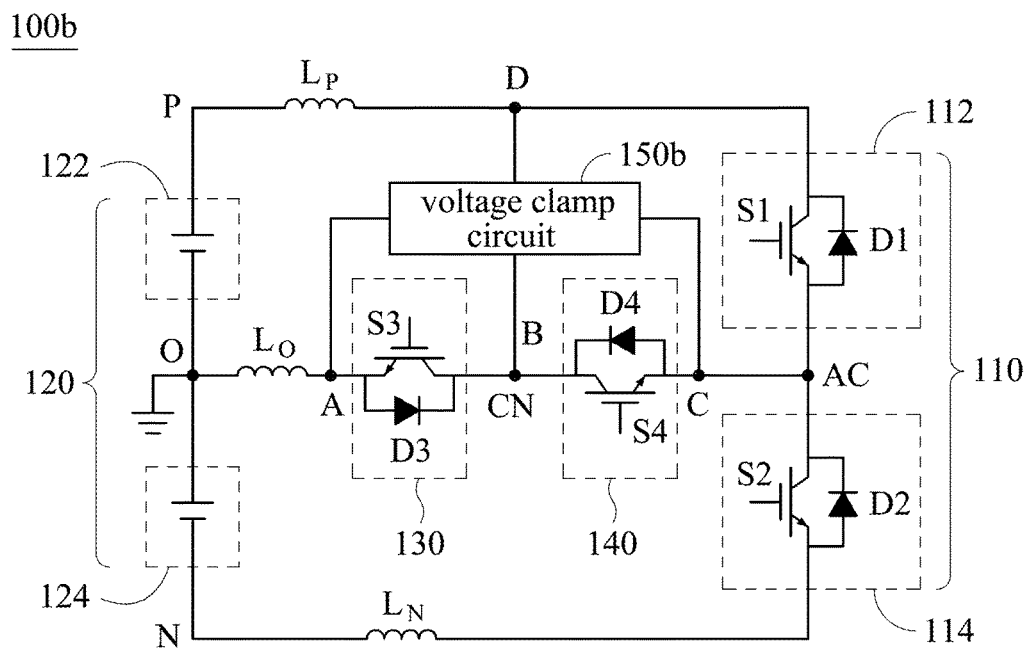
FIG. 1B is a schematic diagram of a converter according to a second embodiment of the present disclosure.

FIG. 1B is a schematic diagram of a converter according to a second embodiment of the present disclosure. Compared to the embodiment illustrated in FIG. 1A, in the converter 100b in FIG. 1B, the voltage clamp circuit 150b is electrically coupled to the output terminal AC, the common connection terminal CN, the neutral point terminal O, and the positive input terminal P, and the voltage clamp circuit 150b is shared by the switch units 130 and 140 to clamp voltages across the switch units 130 and 140. In practice, the converter 100a or the converter 100b may be a T-type neutral-point-clamped (TNPC) converter.

Similarly, in one embodiment, the voltage clamp circuit 150b may include terminals A, B, C, and D, in which the terminal A is electrically coupled to the neutral point terminal O, the terminal B is electrically coupled to the common connection terminal CN where the switch units 130 and 140 are coupled in series, the terminal C is electrically coupled to the output terminal AC, and the terminal D is electrically coupled to the positive input terminal P.

In practice, it is better when the distance from any one of the terminals A, B and C to any one of the switch units 130 and 140 is closer, and the terminal D may be considered as a discharging terminal.

In some embodiments, the switch unit 112 includes a switch S1 and a diode D1 which are anti-parallelly coupled with each other. The switch unit 114 includes a switch S2 and a diode D2 which are anti-parallelly coupled with each other. The switch unit 130 includes a switch S3 and a diode D3 which are anti-parallelly coupled with each other, and the switch unit 140 includes a switch S4 and a diode D4 which are anti-parallelly coupled with each other, in which the switches S3 and S4 are anti-serially and electrically coupled between the neutral point terminal O and the output terminal AC. Hereinafter, the manner that the switches S3 and S4 are anti-serially and electrically coupled may be illustrated below; in the condition that each of the switches S3 and S4 is, for example, an insulated gate bipolar transistor (IGBT), the collector of the switch S3 is electrically coupled to the collector of the switch S4, the emitter of the switch S3 is electrically coupled to the neutral point terminal O, and the emitter of the switch S4 is electrically coupled to the output terminal AC. In further embodiments, each of the switches S3 and S4 may also be implemented by multiple switch devices connected in series or in parallel. In other embodiments, each of the voltage sources 122 and 124 may be implemented by an energy storing device such as capacitor, battery, etc.

In practice, the switches S1, S2, S3, and S4 may be implemented by insulated gate bipolar transistor (IGBT), metal-oxide semiconductor field effect transistor (MOSFET), other type of transistor, or the combination thereof.

In one embodiment, in the condition that the switches S3 and S4 are IGBTs, the collectors of the two IGBTs are electrically coupled at the common connection terminal CN, as illustrated in FIG. 1A and FIG. 1B. In another embodiment, in the condition that the switches S3 and S4 are MOSFETs, the drains of the two MOSFETs are electrically coupled at the common connection terminal CN.

Figure 2:
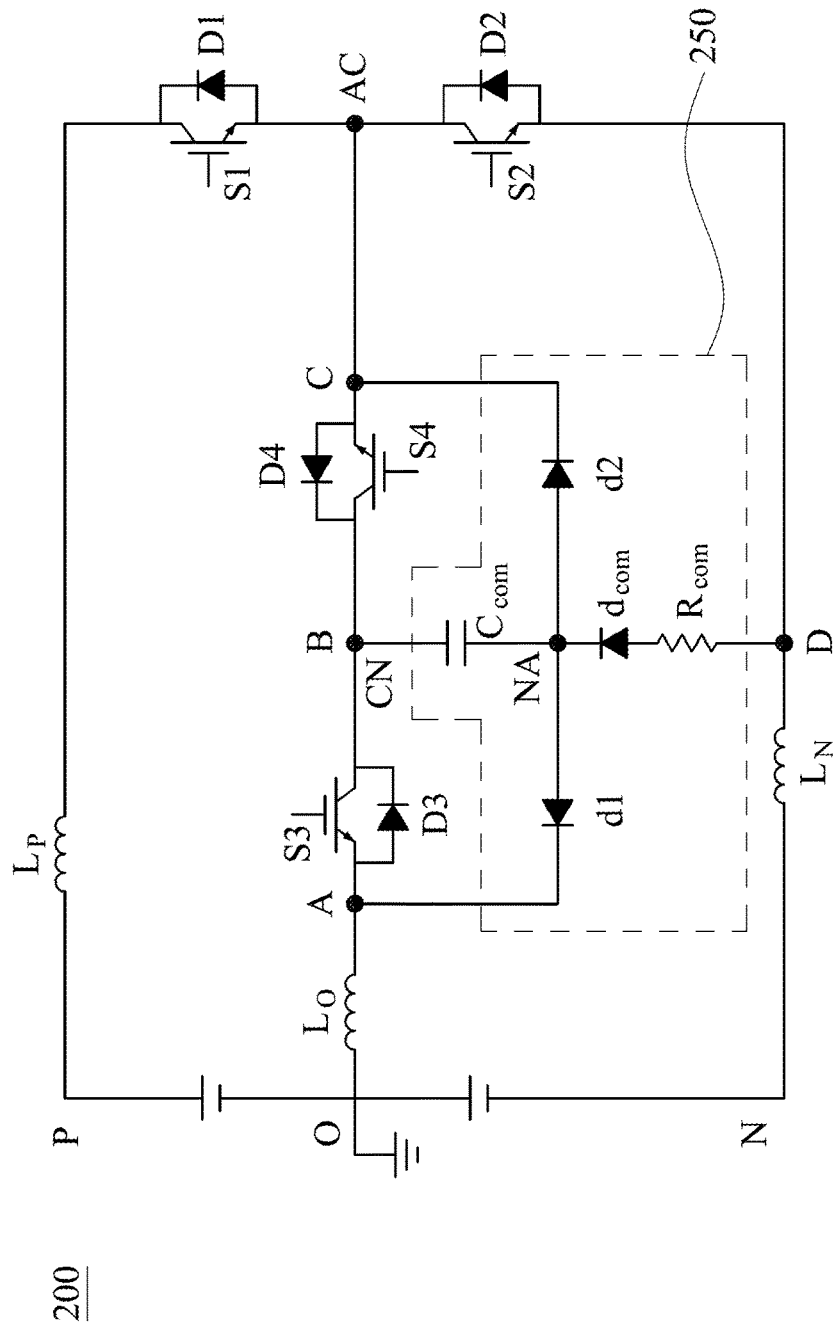
FIG. 2 is a schematic diagram of a converter according to a third embodiment of the present disclosure.

FIG. 2 is a schematic diagram of a converter according to a third embodiment of the present disclosure. Compared to the embodiment illustrated in FIG. 1A, the voltage clamp circuit 250 illustrated in FIG. 2 includes a capacitor Ccom, a resistor Rcom, and diodes dcom, d1 and d2. The diode d1 is electrically coupled between a node NA and the neutral point terminal O, the diode d2 is electrically coupled between the node NA and the output terminal AC, the capacitor Ccom is electrically coupled between the node NA and the common connection terminal CN, and the diode dcom and the resistor Rcom are electrically coupled in series between the node NA and the negative input terminal N.

As illustrated in FIG. 2, the cathode and anode of the diode d2 are electrically coupled to the output terminal AC and the node NA, respectively, and the cathode and anode of the diode dcom are electrically coupled to the node NA and the resistor Rcom, respectively.

For circuit configurations, the capacitor Ccom and the diode d1 may be configured as a charging circuit cooperating with the switch S3, and the capacitor Ccom and the diode d2 may be configured as a charging circuit cooperating with the switch S4; that is, the switches S3 and S4 share the capacitor Ccom during a charging process in the voltage clamp operation. On the other hand, the capacitor Ccom, the resistor Rcom, and the diode dcom may be configured as a discharging circuit cooperating with the switches S3 and S4; that is, the switches S3 and S4 share the capacitor Ccom, the resistor Rcom, and the diode dcom during a discharging process in the voltage clamp operation. The voltage clamp operation associated with the switches S3 and S4 is illustrated in FIGS. 3A-3B and FIGS. 4A-4B.

The term "diode" in the present disclosure may be indicative of a practical diode device, or may also be indicative of a diode implemented by switch device, such as MOSFET, bipolar junction transistor (BJT), or other type of transistor. In other words, the term "diode" in the present disclosure may be replaced by switch device (including active switch or passive switch). Thus, the present disclosure is not limited to the embodiments illustrated in the figures.

Figure 3A:
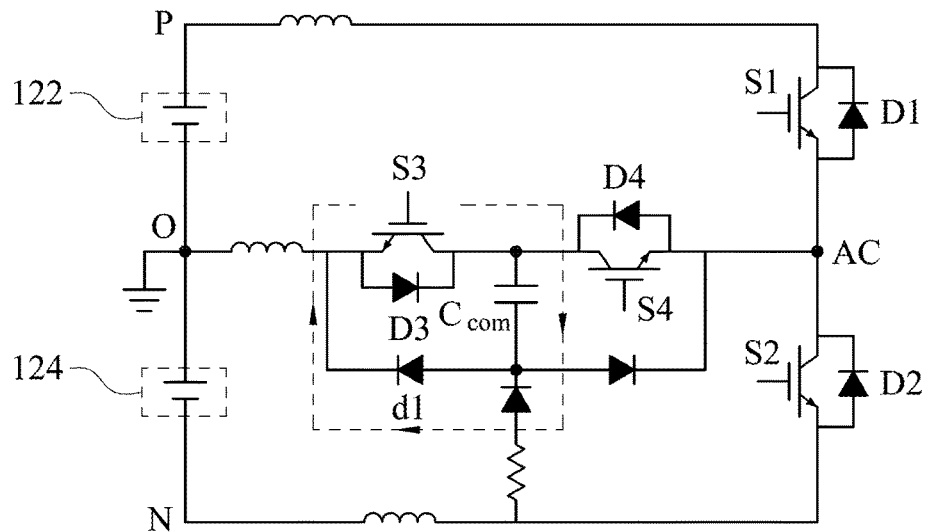
FIGS. 3A-3B are operation diagrams of the converter illustrated in FIG. 2, according to one embodiment of the present disclosure.
Figure 3B:
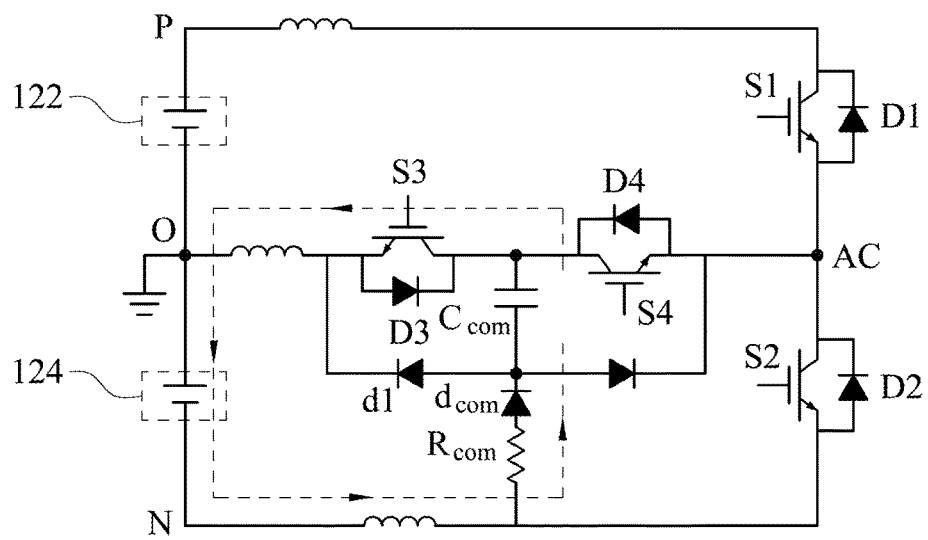

FIGS. 3A-3B are operation diagrams of the converter illustrated in FIG. 2, according to one embodiment of the present disclosure. As illustrated in FIG. 3A, in the period of the switch S3 being switched off, voltage spikes corresponding to the switch S3 are generated, and at the moment, the voltage spikes are absorbed by the capacitor Ccom along a charging loop indicated by the dashed arrow line, and the capacitor Ccom stores electrical energy corresponding to the voltage spikes. Moreover, as illustrated in FIG. 3B, in the period of the switch S3 being switched on, the electrical energy stored by the capacitor Ccom is discharged through the resistor Rcom, the diode dcom and the capacitor Ccom to the negative input terminal N, along a discharging loop indicated by the dashed arrow line. As a result, the voltage clamp operation corresponding to the switch S3 can be performed effectively, thus preventing the switch S3 from being damaged due to the voltage spikes.

As illustrated in FIG. 3A, when the switch S3 is switched off, the diode D3, the capacitor Ccom and the diode d1 are operated as a charging loop, and the capacitor Ccom absorbs the voltage spikes corresponding to the switch S3. On the other hand, as illustrated in FIG. 3B, when the switch S3 is switched on, the switch S3, the voltage source 124, the resistor Rcom, the diode dcom and the capacitor Ccom are operated as a discharging loop, and the capacitor Ccom releases the absorbed electrical energy through the discharging loop to the voltage source 124.

Figure 4A:
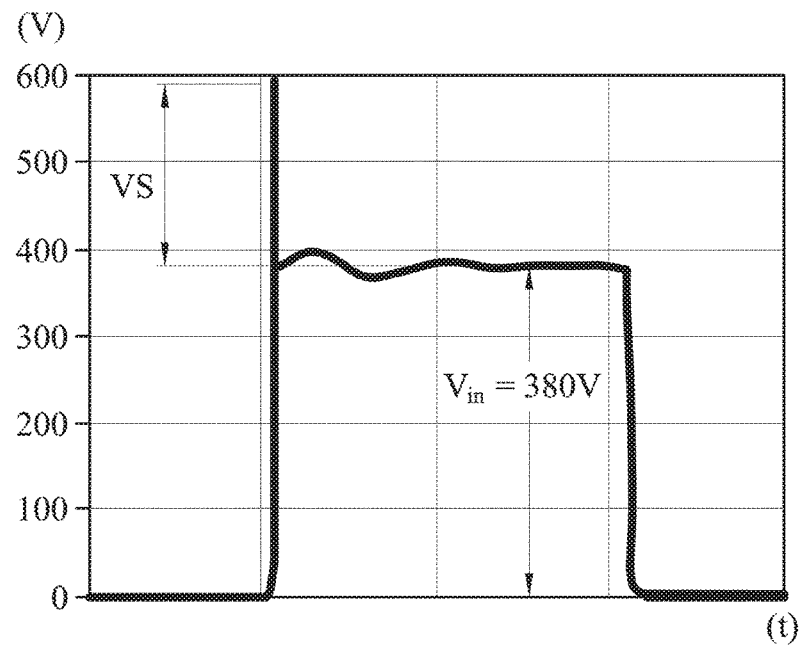
FIG. 4A is a variation diagram of the voltage corresponding to the switch without voltage clamp operation in the conventional art.

FIG. 4A is a variation diagram of the voltage corresponding to the switch without voltage clamp operation in the conventional art. As illustrated in FIG. 4A, when the input voltage Vin is 380 Volts, the voltage spike VS may reach up to 600 Volts and is much higher than a rated voltage sustainable for the switch, further causing damages to the switch.

Figure 4B:
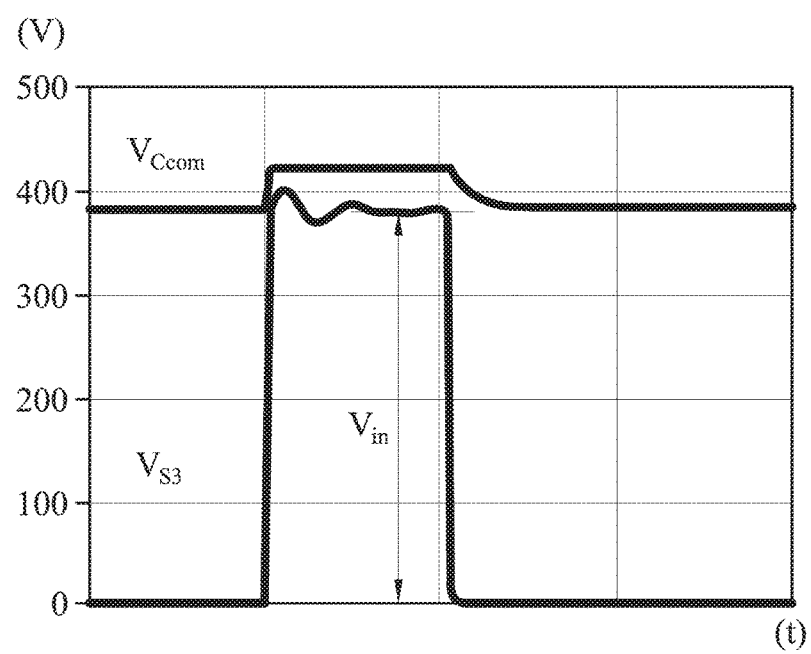
FIG. 4B is a variation diagram of voltages in the converter as illustrated in FIG. 2, according to an embodiment of the present disclosure.

FIG. 4B is a variation diagram of voltages in the converter as illustrated in FIG. 2, according to an embodiment of the present disclosure. Compared to FIG. 4A, a voltage $V_{Ccom}$ stored in the capacitor Ccom increases slightly due to the capacitor Ccom absorbing the voltage spike, and the voltage clamp operation can be performed effectively through the capacitor Ccom, and thus the influence of the voltage spike on the voltage $V_{S3}$ across the switch S3 may be reduced.

Figure 5A:
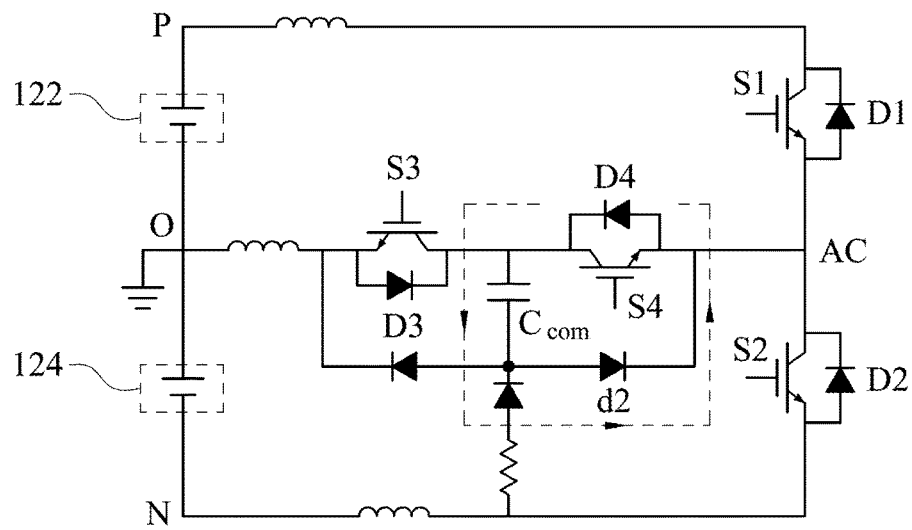
FIGS. 5A-5B are operation diagrams of the converter illustrated in FIG. 2, according to another embodiment of the present disclosure.
Figure 5B:
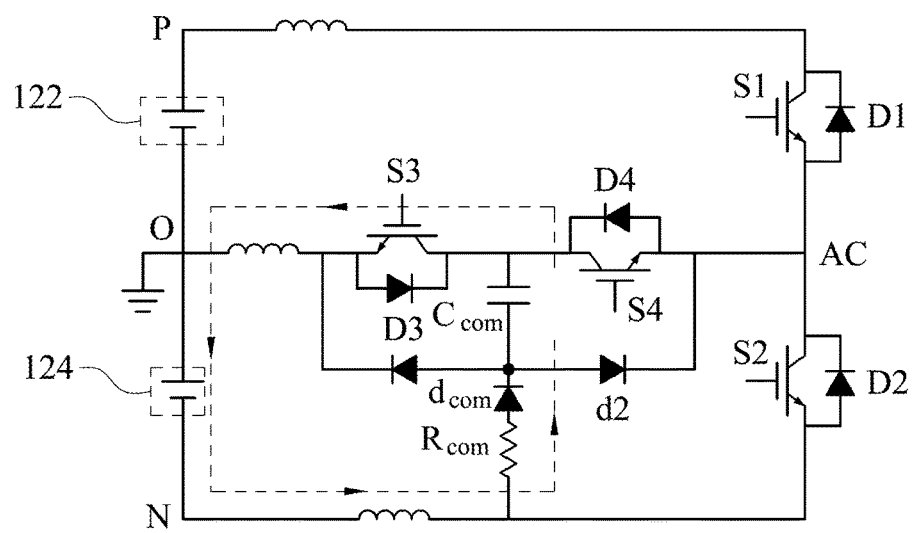

FIGS. 5A-5B are operation diagrams of the converter illustrated in FIG. 2, according to another embodiment of the present disclosure. As illustrated in FIG. 5A, in the period of the switch S4 being switched off, voltage spikes corresponding to the switch S4 are generated, and at the moment, the voltage spikes are absorbed by the capacitor Ccom along a charging loop indicated by the dashed arrow line, and the capacitor Ccom stores electrical energy corresponding to the voltage spikes. Moreover, as illustrated in FIG. 5B, in the period of the switch S4 being switched on, the electrical energy stored by the capacitor Ccom is discharged through the resistor Rcom, the diode dcom and the capacitor Ccom to the negative input terminal N, along a discharging loop indicated by the dashed arrow line. As a result, the voltage clamp operation corresponding to the switch S4 can be performed effectively, thus preventing the switch S4 from being damaged due to the voltage spikes.

As illustrated in FIG. 5A, when the switch S4 is switched off, the diode D4, the capacitor Ccom and the diode d2 are operated as a charging loop, and the capacitor Ccom absorbs the voltage spikes corresponding to the switch S4. On the other hand, as illustrated in FIG. 5B, when the switch S3 is switched on, the switch S3, the voltage source 124, the resistor Rcom, the diode dcom and the capacitor Ccom are operated as a discharging loop, and the capacitor Ccom releases the absorbed electrical energy through the discharging loop to the voltage source 124.

Figure 6:
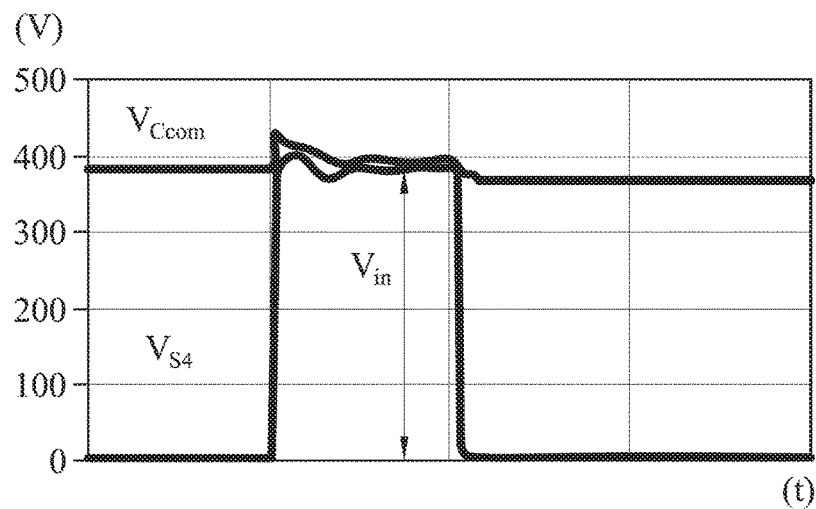
FIG. 6 is a variation diagram of voltages in the converter as illustrated in FIG. 2, according to another embodiment of the present disclosure.

FIG. 6 is a variation diagram of voltages in the converter as illustrated in FIG. 2, according to another embodiment of the present disclosure. Compared to FIG. 4A, the voltage $V_{Ccom}$ stored in the capacitor Ccom increases slightly due to the capacitor Ccom absorbing the voltage spike, and the voltage clamp operation can be performed effectively through the capacitor Ccom, and thus the influence of the voltage spike on the voltage $V_{S4}$ across the switch S4 can be reduced.

Based on the aforementioned descriptions, the voltage spikes corresponding to the switches S3 and S4 can be suppressed effectively through the voltage clamp circuit 250 illustrated in FIG. 2, and the switches S3 and S4 can share the capacitor Ccom, the resistor Rcom and the diode dcom, such that the component number may be reduced so as to improve circuit reliability and decrease manufacturing cost.

Figure 7:
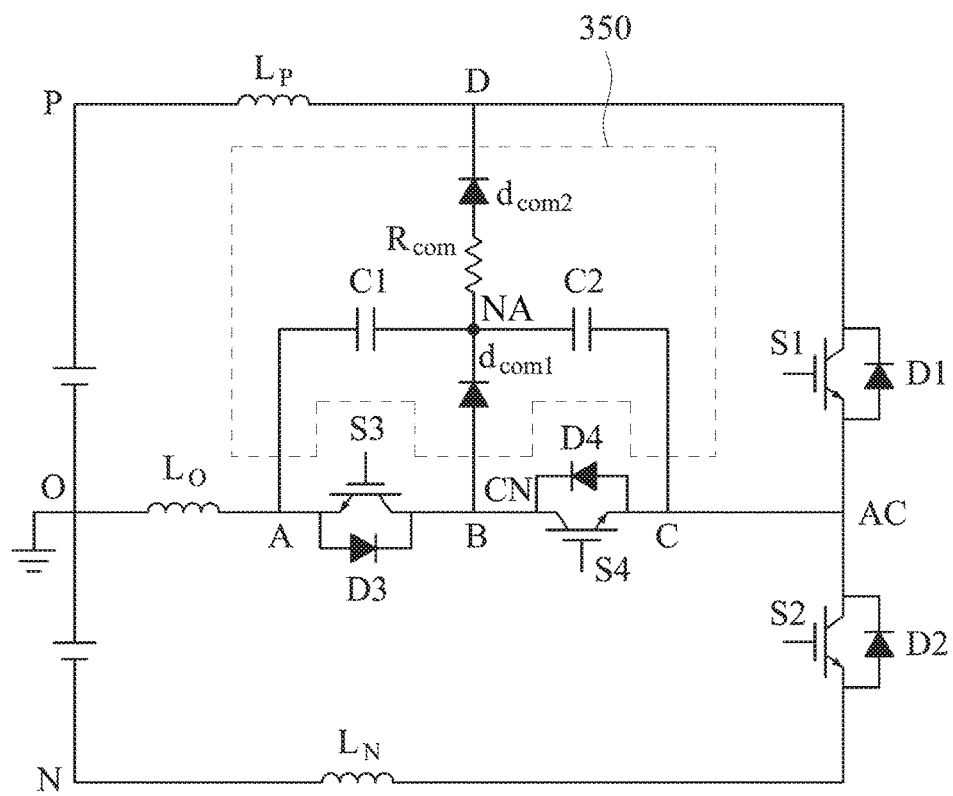
FIG. 7 is a schematic diagram of a converter according to a fourth embodiment of the present disclosure.

FIG. 7 is a schematic diagram of a converter according to a fourth embodiment of the present disclosure. Compared to the embodiment illustrated in FIG. 2, the voltage clamp circuit 350 illustrated in FIG. 7 includes capacitors C1 and C2, a resistor Rcom, and diodes dcom1 and dcom2. The diode dcom1 is electrically coupled between the node NA and the common connection terminal CN, the capacitor C1 is electrically coupled between the node NA and the neutral point terminal O, the capacitor C2 is electrically coupled between the node NA and the output terminal AC, the resistor Rcom and the diode dcom2 are electrically coupled in series between the node NA and the positive input terminal P.

As illustrated in FIG. 7, the anode and cathode of the diode dcom1 are electrically coupled to the common connection terminal CN and the node NA, respectively, and the anode and cathode of the diode dcom2 are electrically coupled to the resistor Rcom and the positive input terminal P, respectively.

For circuit configurations, the switches S3 and S4 share the diode dcom1 during the charging process in the voltage clamp operation. On the other hand, the switches S3 and S4 share the resistor Rcom and the diode dcom2 during the discharging process in the voltage clamp operation.

In the voltage clamp operation, the voltage spikes corresponding to the switch S3 are absorbed by the capacitor C1, the capacitor C1 stores electrical energy corresponding to the voltage spikes, and then the electrical energy stored by the capacitor C1 is discharged through the resistor Rcom and the diode dcom2 to the positive input terminal P. Similarly, the voltage spikes corresponding to the switch S4 are absorbed by the capacitor C2, the capacitor C2 stores electrical energy corresponding to the voltage spikes, and then the electrical energy stored by the capacitor C2 is discharged through the resistor Rcom and the diode dcom2 to the positive input terminal P. As a result, the voltage clamp operation corresponding to the switches S3 and S4 may be performed effectively, thus preventing the switches S3 and S4 from being damaged due to the voltage spikes.

Figure 8A:
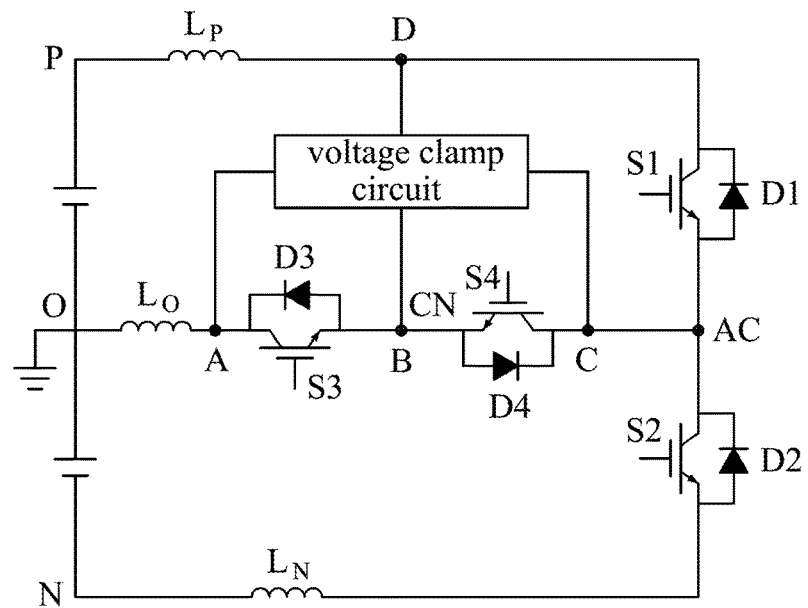
FIG. 8A is a schematic diagram of a converter according to a fifth embodiment of the present disclosure.

On the other hand, the aforementioned converter can also have various types of topology configurations. FIG. 8A is a schematic diagram of a converter according to a fifth embodiment of the present disclosure. Compared to the embodiment illustrated in FIG. 1B, as illustrated in FIG. 8A, in the condition that the switches S3 and S4 are IGBTs, the emitters of the two IGBTs are electrically coupled at the common connection terminal CN. Similarly, in another embodiment, in the condition that the switches S3 and S4 are MOSFETs, the sources of the two MOSFETs are electrically coupled at the common connection terminal CN.

Figure 8B:
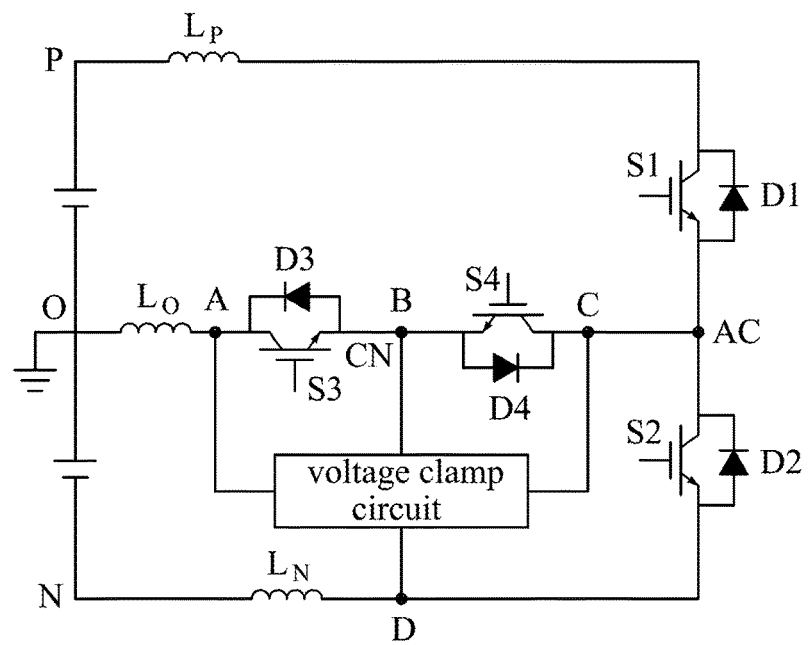
FIG. 8B is a schematic diagram of a converter according to a sixth embodiment of the present disclosure.

In addition, FIG. 8B is a schematic diagram of a converter according to a sixth embodiment of the present disclosure. Compared to the embodiment illustrated in FIG. 1A, as illustrated in FIG. 8B, in the condition that the switches S3 and S4 are IGBTs, the emitters of the two IGBTs are electrically coupled at the common connection terminal CN. Similarly, in another embodiment, in the condition that the switches S3 and S4 are MOSFETs, the sources of the two MOSFETs are electrically coupled at the common connection terminal CN.

Figure 9A:
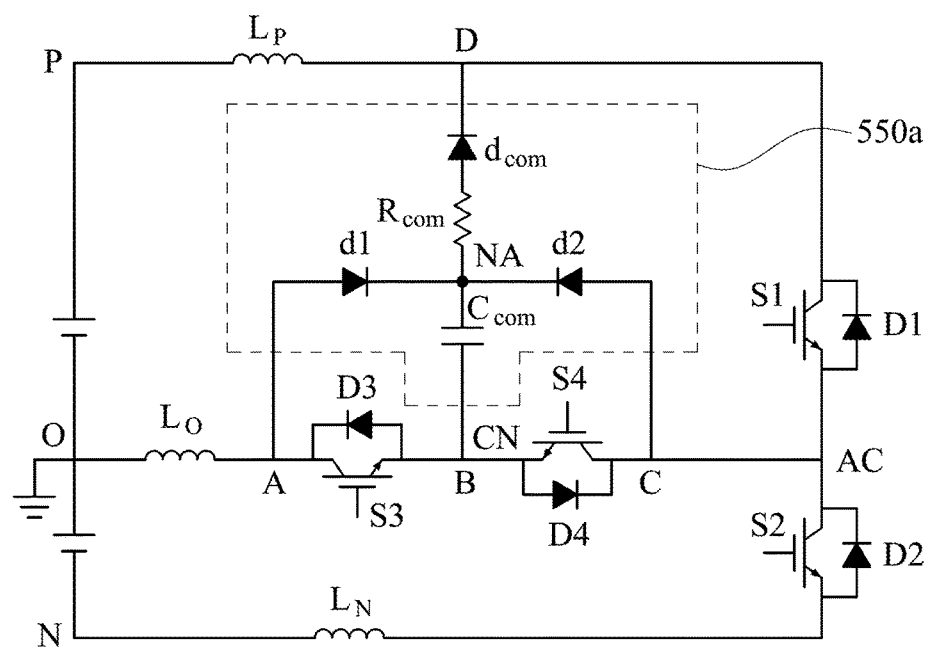
FIG. 9A is a schematic diagram of a converter according to a seventh embodiment of the present disclosure.

FIG. 9A is a schematic diagram of a converter according to a seventh embodiment of the present disclosure. Compared to FIG. 2, in the voltage clamp circuit 550a, the diode d1 is electrically coupled between the node NA and the neutral point terminal O, the diode d2 is electrically coupled between the node NA and the output terminal AC, the capacitor Ccom is electrically coupled between the node NA and the common connection terminal CN, and the diode dcom and the resistor Rcom are electrically coupled in series between the node NA and the positive input terminal P.

As illustrated in FIG. 9A, the cathode and anode of the diode d1 are electrically coupled to the node NA and the neutral point terminal O, respectively, the cathode and anode of the diode d2 are electrically coupled to the node NA and the output terminal AC, respectively, and the cathode and anode of the diode dcom are electrically coupled to the positive input terminal P and the resistor Rcom.

The operation of the voltage clamp circuit 550a in FIG. 9A is similar to that of the voltage clamp circuit 250 in FIG. 2, in which the difference therebetween lies in that the electrical energy stored by the capacitor Ccom in FIG. 9A will be discharged to the positive input terminal P.

Figure 9B:
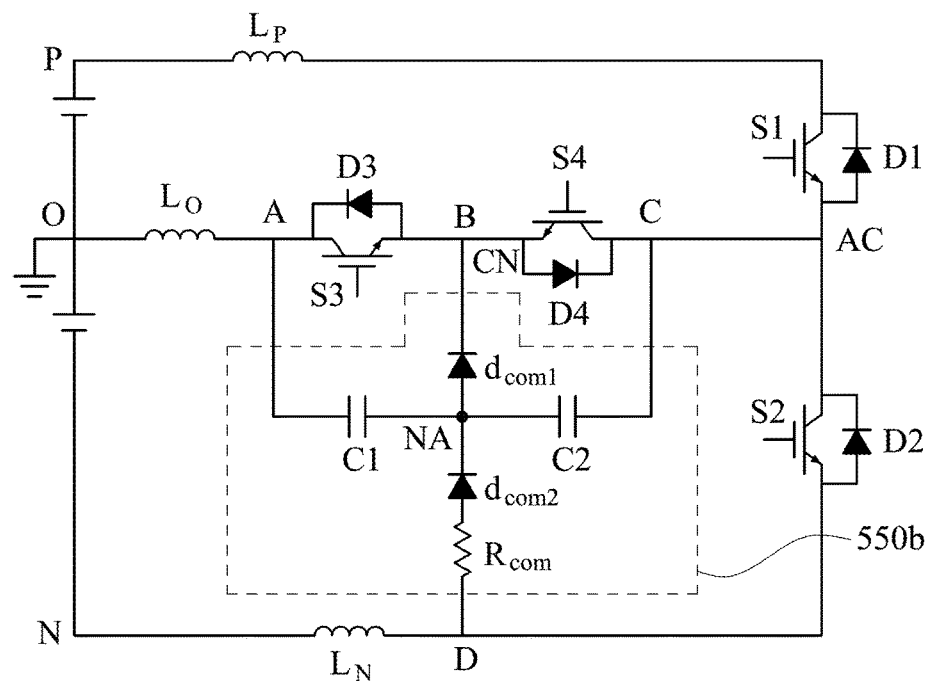
FIG. 9B is a schematic diagram of a converter according to an eighth embodiment of the present disclosure.

FIG. 9B is a schematic diagram of a converter according to an eighth embodiment of the present disclosure. Compared to FIG. 7, in the voltage clamp circuit 550b, the diode dcom1 is electrically coupled between the node NA and the common connection terminal CN, the capacitor C1 is electrically coupled between the node NA and the neutral point terminal O, the capacitor C2 is electrically coupled between the node NA and the output terminal AC, and the resistor Rcom and the diode dcom2 are electrically coupled in series between the node NA and the negative input terminal N.

As illustrated in FIG. 9B, the cathode and anode of the diode dcom1 are electrically coupled to the common connection terminal CN and the node NA, respectively, and the cathode and anode of the diode dcom2 are electrically coupled to the node NA and the resistor Rcom, respectively.

The operation of the voltage clamp circuit 550b in FIG. 9B is similar to that of the voltage clamp circuit 350 in FIG. 7, in which the difference therebetween lies in that the electrical energy stored by the capacitor C1 or C2 in FIG. 9B will be discharged to the negative input terminal N.

Figure 10:
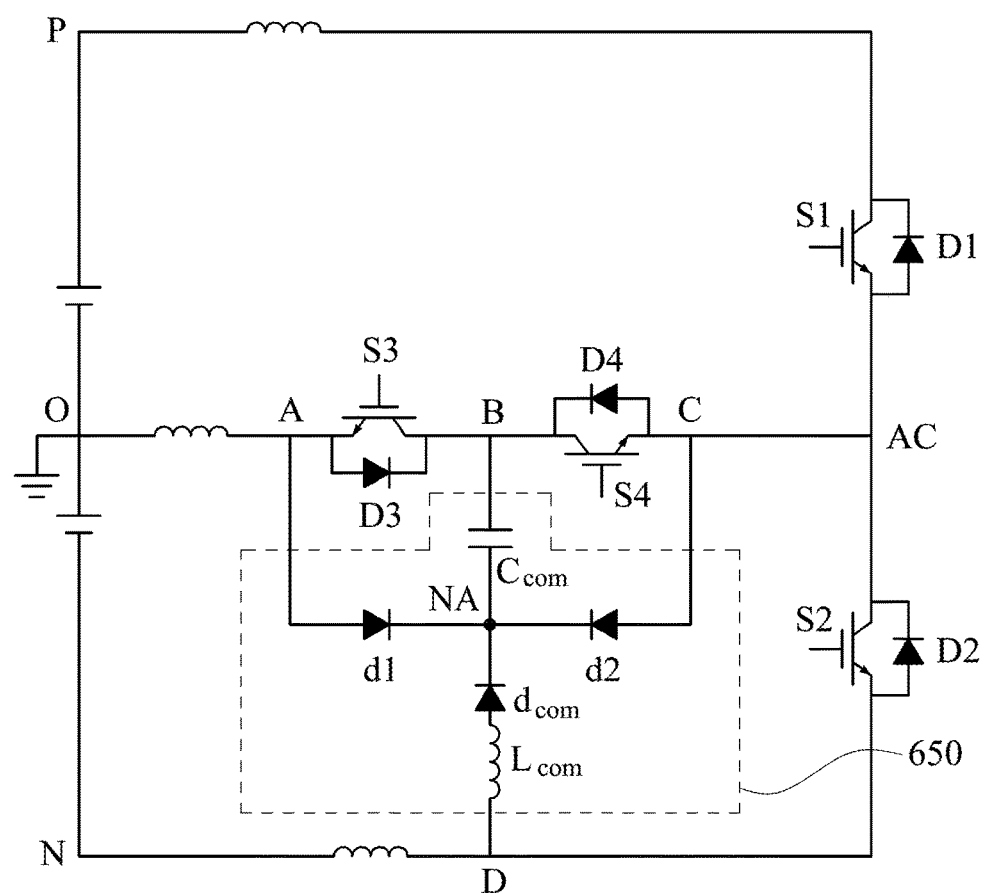
FIG. 10 is a schematic diagram of a converter according to a ninth embodiment of the present disclosure.

In order to reduce losses on the resistor Rcom during the discharging process in the voltage clamp operation, the resistor Rcom may also be replaced by an inductor. FIG. 10 is a schematic diagram of a converter according to a ninth embodiment of the present disclosure. Compared to FIG. 2, the voltage clamp circuit 650 illustrated in FIG. 10 includes an inductor Lcom instead of the resistor Rcom, in which the inductor Lcom and the diode dcom are electrically coupled in series between the node NA and the negative input terminal N.

Figure 11A:
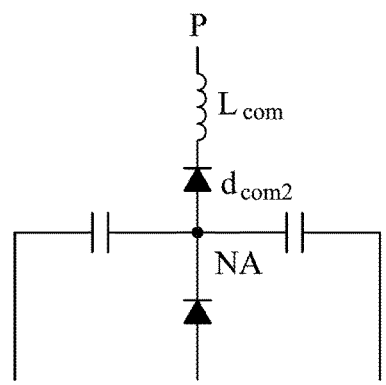
FIGS. 11A-11C are schematic diagrams of various voltage clamp circuits according to some embodiments of the present disclosure.
Figure 11B:
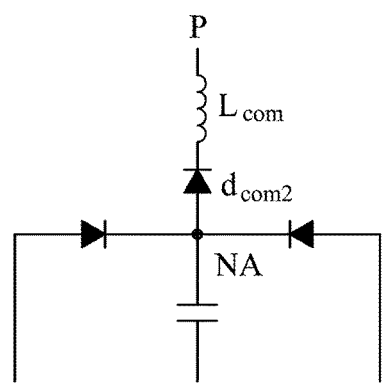
Figure 11C:
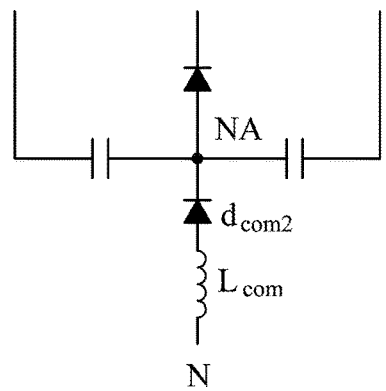
Figure 12A:
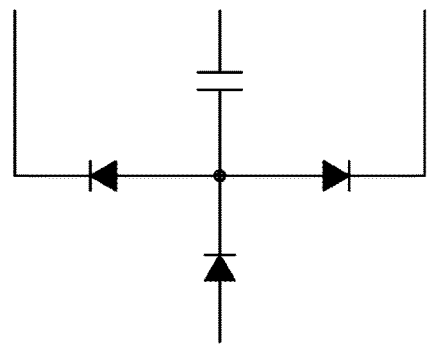
FIGS. 12A-12D are schematic diagrams of various voltage clamp circuits according to some embodiments of the present disclosure.
Figure 12B:
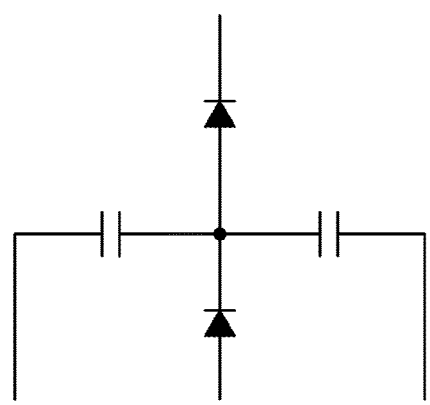
Figure 12C:
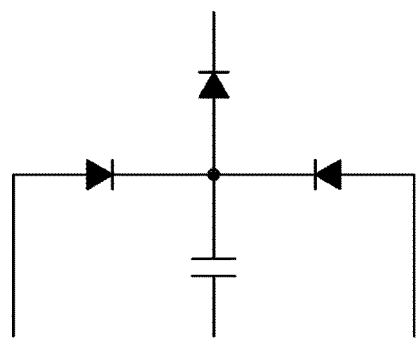
Figure 12D:
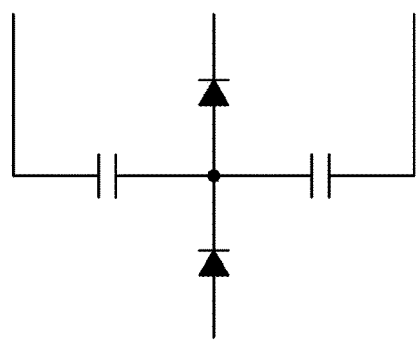

FIGS. 11A-11C are schematic diagrams of various voltage clamp circuits according to some embodiments of the present disclosure. As illustrated in FIG. 11A, compared to the embodiment illustrated in FIG. 7, the voltage clamp circuit includes the inductor Lcom instead of the resistor Rcom, in which the inductor Lcom and the diode dcom2 are electrically coupled in series between the node NA and the positive input terminal P. Moreover, as illustrated in FIG. 11B, compared to the embodiment illustrated in FIG. 9A, the voltage clamp circuit includes the inductor Lcom instead of the resistor Rcom, in which the inductor Lcom and the diode dcom are electrically coupled in series between the node NA and the positive input terminal P. Furthermore, as illustrated in FIG. 11C, compared to the embodiment illustrated in FIG. 9B, the voltage clamp circuit includes the inductor Lcom instead of the resistor Rcom, in which the inductor Lcom and the diode dcom2 are electrically coupled in series between the node NA and the negative input terminal N.

Operations of the voltage clamp circuits as illustrated in FIG. 10 and FIGS. 11A-11C are basically similar to those of the voltage clamp circuits as illustrated in FIG. 2, FIG. 7, FIG. 9A and FIG. 9B, respectively, and thus they are not further detailed herein.

On the other hand, the inductor Lcom or the resistor Rcom mentioned above may also be omitted, such that the circuit configuration of the voltage clamp circuit becomes much simpler. FIGS. 12A-12D are schematic diagrams of various voltage clamp circuits according to some embodiments of the present disclosure. The voltage clamp circuits illustrated in FIGS. 12A-12D are similar to the voltage clamp circuits illustrated in FIG. 10 and FIGS. 11A-11C, respectively, but the voltage clamp circuits illustrated in FIGS. 12A-12D do not include the inductor Lcom (or the resistor Rcom), compared to the voltage clamp circuits illustrated in FIG. 10 and FIGS. 11A-11C. As a result, the circuit configuration of the voltage clamp circuit may be much simpler.

Figure 13A:
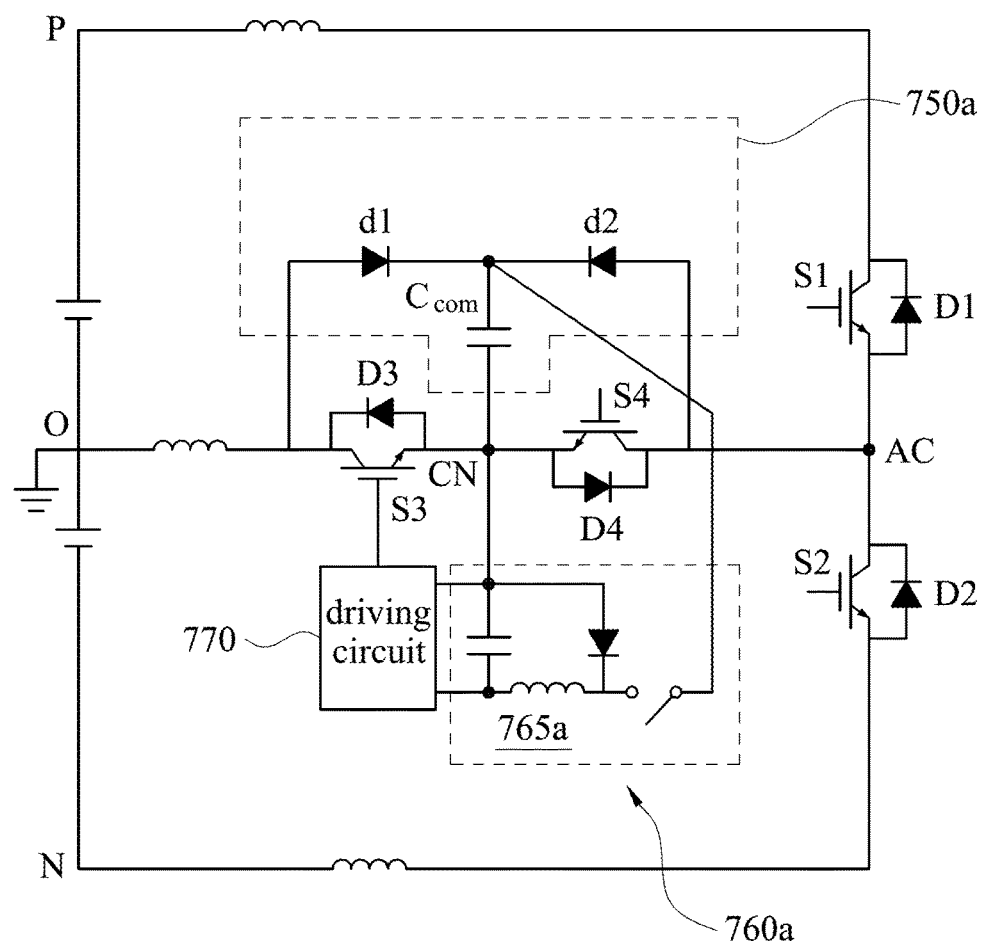
FIG. 13A is a schematic diagram of a converter according to a tenth embodiment of the present disclosure.

FIG. 13A is a schematic diagram of a converter according to a tenth embodiment of the present disclosure. As illustrated in FIG. 13A, the voltage clamp circuit includes a sharing circuit 750a and an active circuit 760a, in which the active circuit 760a is electrically coupled to the sharing circuit 750a.

The sharing circuit 750a is electrically coupled to the output terminal AC, the common connection terminal CN and the neutral point terminal O, and the sharing circuit 750a is configured to clamp voltages across the switches S3 and S4 and configured to store a clamping voltage (i.e., a voltage stored corresponding to the voltage spikes). In the present embodiment, the sharing circuit 750a includes the capacitor Ccom and the diodes d1 and d2, the connection relationship of the capacitor Ccom and the diodes d1 and d2 is similar to that illustrated in FIG. 9A, and the capacitor Ccom may be configured to store the aforementioned clamping voltage.

Moreover, the active circuit 760a is configured to output an operation voltage to a driving circuit 770 according to the clamping voltage, and the driving circuit 770 is configured to drive the switch S3. In the present embodiment, the active circuit 760a includes a DC-to-DC (DC/DC) converter 765a, e.g., buck converter, wherein input terminals of the DC-to-DC converter 765a are electrically coupled to two terminals of the capacitor Ccom, and output terminals of the DC-to-DC converter 765a are electrically coupled to the driving circuit 770.

In the voltage clamp operation, after the capacitor Ccom stores the electrical energy corresponding to the voltage spikes, the electrical energy stored by the capacitor Ccom is converted by use of the DC-to-DC converter 765a and fed back to provide supply for the driving circuit 770.

In some embodiments, the active circuit 760a may also output the operation voltage to the driving circuit for driving the switch S4. In other embodiments, the active circuit 760a may also output the operation voltage to the positive input terminal P, the negative input terminal N or the output terminal AC.

Figure 13B:
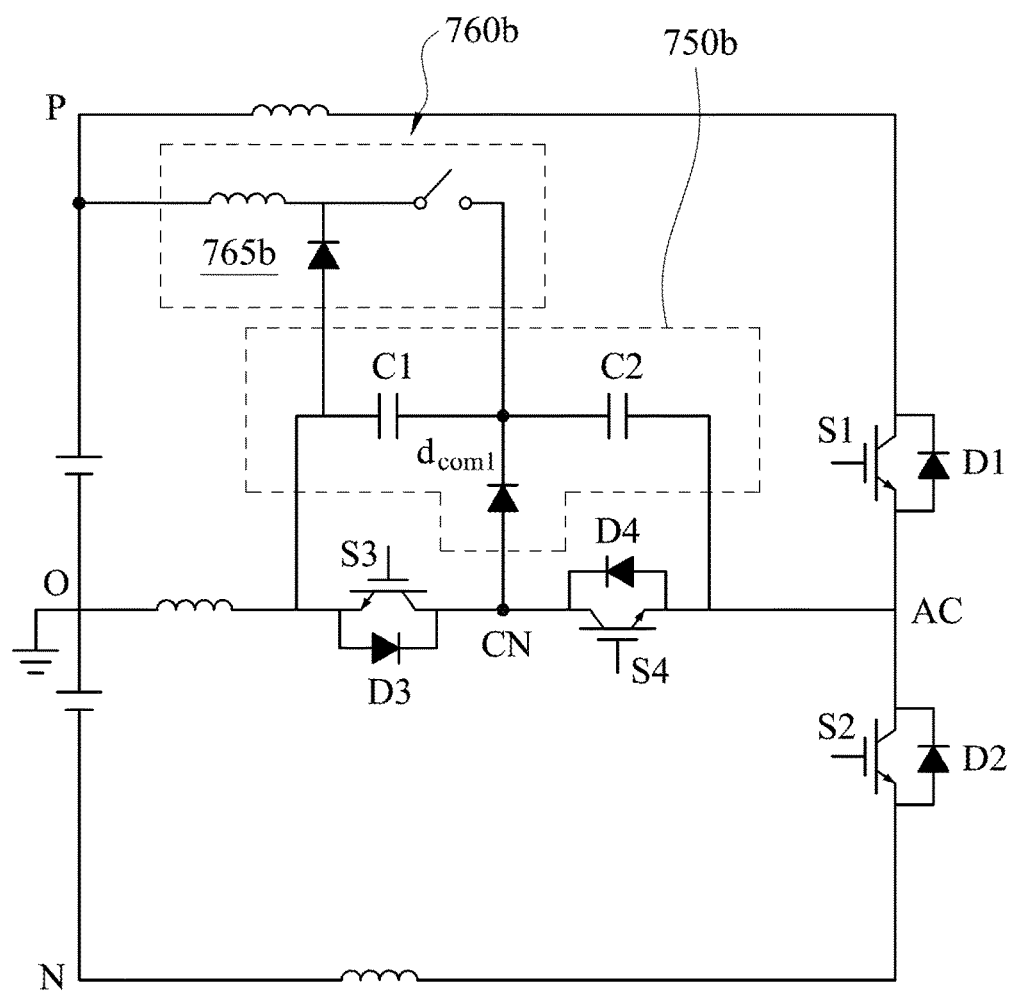
FIG. 13B is a schematic diagram of a converter according to an eleventh embodiment of the present disclosure.

FIG. 13B is a schematic diagram of a converter according to an eleventh embodiment of the present disclosure. As illustrated in FIG. 13B, the voltage clamp circuit includes a sharing circuit 750b, and an active circuit 760b electrically coupled to the sharing circuit 750b.

Similarly, the sharing circuit 750b is electrically coupled to the output terminal AC, the common connection terminal CN and the neutral point terminal O. The sharing circuit 750b is configured to clamp voltages across the switches S3 and S4 and configured to store a clamping voltage (i.e., a voltage stored corresponding to the voltage spikes). In the present embodiment, the sharing circuit 750b includes capacitors C1 and C2 and a diode dcom1, in which the connection relationship of the capacitors C1 and C2 and the diode dcom1 is similar to that illustrated in FIG. 7, and the capacitors C1 and C2 may be configured to store the aforementioned clamping voltage.

Moreover, the active circuit 760b is configured to output the operation voltage to the positive input terminal P according to the clamping voltage. In the present embodiment, the active circuit 760b includes a DC-to-DC (DC/DC) converter 765b, e.g., buck converter, wherein input terminals of the DC-to-DC converter 765b are electrically coupled to two terminals of the capacitor C1, and an output terminal of the DC-to-DC converter 765b is electrically coupled to the positive input terminal P.

In the voltage clamp operation, after the capacitor C1 stores the electrical energy corresponding to the voltage spikes, the electrical energy stored by the capacitor C1 is converted by use of the DC-to-DC converter 765b and outputted to the positive input terminal P.

In some embodiments, the input terminals of the active circuit 760b (or the DC-to-DC converter 765b) can also be electrically coupled to two terminals of the capacitor C2. In other embodiments, the output terminals of the active circuit 760b (or the DC-to-DC converter 765b) can also be electrically coupled to the negative input terminal N.

In practice, the configurations of the voltage clamp circuits in the aforementioned embodiments can be applied in the sharing circuit 750a illustrated in FIG. 13A or the sharing circuit 750b illustrated in FIG. 13B according to practical needs; in other words, FIG. 13A and FIG. 13B are only given for illustrative purposes and not limiting of the present disclosure.

In addition, in practice, each of the diodes illustrated in the aforementioned embodiments may be implemented by a switch, e.g., MOSFET, BJT, or other type of transistor. Moreover, the aforementioned embodiments illustrate examples applied in the configuration with single-phase output, but they are only given for illustrative purposes and not limiting of the present disclosure; in other words, one of ordinary skill in the art can apply similar circuit configurations in converters with multiple phase (three phase) output.

Based on the aforementioned embodiments, the voltage spikes can be suppressed effectively through the voltage clamp circuit, and the switches which are affected by the voltage spikes can share the voltage clamp circuit, such that component number may be reduced so as to improve circuit reliability and decrease manufacturing cost.

As is understood by one of ordinary skill in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A converter comprising:
a first bridge arm comprising a first switch unit and a second switch unit electrically coupled in series at an output terminal;
a second bridge arm comprising a first voltage source and a second voltage source electrically coupled in series at a neutral point terminal, wherein the first voltage source and the second voltage source are arranged between a positive input terminal and a negative input terminal;
a third switch unit and a fourth switch unit electrically coupled in series at a common connection terminal and arranged between the neutral point terminal and the output terminal;
a voltage clamp circuit comprising:
a sharing circuit, electrically coupled to the output terminal, the common connection terminal and the neutral point terminal, wherein the sharing circuit is configured to clamp voltages across the third switch unit and the fourth switch unit, and the sharing circuit comprises a first capacitor coupled between a node and the common connection terminal to store a clamping voltage; and
an active circuit comprising a DC-to-DC converter electrically coupled to the sharing circuit at the node and the common connection terminal,
wherein the DC-to-DC converter comprises at least a fifth switch and a second capacitor, wherein the fifth switch is electrically coupled to the first capacitor and the second capacitor, the DC-to-DC converter is configured to output an operation voltage, via the second capacitor, to one of the positive input terminal, negative input terminal, the output terminal, and a driving circuit, according to the clamping voltage, wherein the driving circuit is configured to drive the third switch unit or the fourth switch unit.

2. The converter as claimed in claim 1, wherein the sharing circuit further comprises a first diode electrically coupled between the node and the neutral point terminal, and a second diode electrically coupled between the node and the output terminal,
wherein the DC-to-DC converter comprises input terminals electrically coupled to two terminals of the first capacitor, and output terminals electrically coupled to the driving circuit,
wherein the DC-to-DC converter further comprises:
a third diode electrically coupled to the second capacitor and the fifth switch; and
an inductor electrically coupled between the second capacitor and the third diode.

* * * * *